United States Patent [19]

Tamura et al.

[11] Patent Number: 5,635,544
[45] Date of Patent: *Jun. 3, 1997

[54] PROCESS FOR PREPARING A UV-CURABLE COATING MATERIAL AND ANTI-ABRASION COATING COMPOSITION

[75] Inventors: Misao Tamura; Hiroshi Fukushima, both of Nagoya, Japan

[73] Assignee: Mitsubishi Rayon Co., Ltd., Tokyo, Japan

[ * ] Notice: The term of this patent shall not extend beyond the expiration date of Pat. No. 5,449,702.

[21] Appl. No.: 481,836

[22] Filed: Jun. 7, 1995

Related U.S. Application Data

[63] Continuation-in-part of Ser. No. 982,726, Nov. 27, 1992, Pat. No. 5,449,702.
[51] Int. Cl.$^6$ ........................................ C08F 2/46
[52] U.S. Cl. ........................ 522/79; 522/4; 522/64; 522/83; 522/173; 427/510; 524/385
[58] Field of Search ........................ 522/4, 64, 79, 522/83, 173; 427/510; 524/385

[56] References Cited

U.S. PATENT DOCUMENTS 5,449,702  9/1995  Tayama et al. ........................ 522/4

FOREIGN PATENT DOCUMENTS 07109355  4/1995  Japan .

*Primary Examiner*—Mark Chapman
*Attorney, Agent, or Firm*—Oblon, Spivak, McClelland, Maier & Neustadt, P.C.

[57] ABSTRACT

Disclosed is a process for preparing a UV-curable coating material comprising the steps of effecting a hydrolysis reaction of (a-1) 40 to 90 parts by weight of colloidal silica, and (a-2) 60 to 10 parts by weight of a hydrolyzate of an alkoxy silane compound containing not less than 50% by weight of a compound of the formula (I)

$$(X-R^1)_a-\underset{\underset{(R^2)_b}{|}}{Si}-(OR^3)_{4-a-b}; \quad (I)$$

replacing the dispersion medium of the colloidal silica with a nonpolar solvent when the amount of dehydration is in the range of 50 to 90% of theoretical value; and effecting a further condensation reaction while maintaining in the state of 30 to 90% by weight of solid components in the presence of the nonpolar solvent.

A coating composition containing the UV-curable coating material can form an anti-abrasion-coating film having excellent abrasion resistance, surface smoothness, thermal resistance, chemical resistance, durability, weather resistance and adhesion to the substrate.

3 Claims, No Drawings

PROCESS FOR PREPARING A UV-CURABLE COATING MATERIAL AND ANTI-ABRASION COATING COMPOSITION

BACKGROUND OF THE INVENTION

1. Field of the Invention

This application is a Continuation-in-Part of Ser. No. 07/982,726, filed Nov. 27, 1992, now U.S. Pat. No. 5,449,702, incorporated herein in its entirety by reference. This invention relates to coating compositions which, when applied to substrate surfaces and exposed to actinic radiation, can form a crosslinked and cured film having excellent abrasion resistance, surface smoothness, thermal resistance, chemical resistance, durability, weather resistance and adhesion to the substrate.

2. Description of the Prior Art

Synthetic resin molded articles formed of polymethyl methacrylate resin, polymethacrylimide resin, polycarbonate resins, polystyrene resin and AS resin have lighter weight and higher impact resistance than glass products. Moreover, they have high transparency and can be shaped easily. Owing to these various advantages, they have recently come to be used in a wide variety of applications including automobile plastic parts.

On the other hand, the surfaces of such synthetic resin molded articles do not have sufficient abrasion resistance, so that they are subject to damage as a result of contact with other harder objects, friction, scratching and the like. Since any damage caused to the surfaces of such synthetic resin molded articles diminishes their commercial value significantly and/or makes them unusable in a short period of time, it is strongly desired to improve the abrasion resistance of their surfaces. Moreover, where they are used as automobile parts, their weather resistance is also regarded as essential.

In order to overcome the above-described disadvantages of synthetic resin molded articles, various attempts have heretofore been made. For example, U.S. Pat. No. 4,006,271 discloses a method for improving the abrasion resistance of synthetic resin molded articles wherein a coating material comprising a partially hydrolyzed and condensed product of a silane mixture composed chiefly of an alkyltrialkoxysilane and colloidal silica is applied to the surface of a synthetic resin molded article and then heated to form a crosslinked and cured film. Although a high degree of abrasion resistance can be achieved by this method, the resulting film tends to have insufficient adhesion to the surface of the molded article. In order to enhance this adhesion, it is necessary to use an acrylic polymer or a silicone as a primer. This is disadvantageous in that a complicated treating procedure is required. Moreover, the curing time is so long that economic losses and low productivity result.

In order to overcome these disadvantages, U.S. Pat. No. 4,348,462 discloses a method of making abrasion-resistant synthetic resin molded articles wherein an ultravioletcuring coating material comprising colloidal silica, an alkoxysilane having a methacryloyl or glycidyl functional group, and a non-silyl acrylate is applied to the surface of a synthetic resin molded article and then exposed to ultraviolet light. In addition, U.S. Pat. No. 4,491,508 discloses the use of a coating composition comprising colloidal silica, a hydrolyzate of a silyl acrylate, a polyfunctional acrylate and a photopolymerization initiator and containing essentially no organic solvent. These methods involve the use of ultraviolet light for curing purposes and have the advantage that the long curing time which has heretofore been encountered with silicone-based coating films can be reduced markedly. Moreover, they are highly effective in improving the abrasion resistance of synthetic resin molded articles.

Of the above-described methods, however, the former one can enhance productivity, but has the disadvantage that the durability and weather resistance of the resulting cured film are less than satisfactory. Moreover, a complicated treating procedure is still required because the surfaces of synthetic resin molded articles must be undercoated with a primer composition prior to application of the coating composition. The latter method, which uses essentially no organic solvent, the coating film formed by applying the coating composition to a synthetic resin molded article has poor surface smoothness and tends to develop surface defects such as cissing and pinholes. Moreover, the properties of the cured film are reduced after being subjected to a hot water resistance test, a thermal cycling test or a weather resistance test. Furthermore, the above-described prior-art methods have the additional disadvantage that, owing to the properties of the monomers used, the coating composition must be cured in an atmosphere of nitrogen and cannot be cured in air.

SUMMARY OF THE INVENTION

It is a first object of the present invention to provide a process for preparing a UV-curable coating material used for an anti-abrasion coating composition which, when applied to substrate surfaces and cured, can form a crosslinked and cured film having excellent curing property, abrasion resistance, surface smoothness, thermal resistance, chemical resistance, durability, weather resistance and adhesion to the substrate.

It is a second object of the present invention to provide an anti-abrasion coating composition containing the UV-curable coating material.

The above-described first object of the present invention is accomplished by the provision of a process for preparing a UV-curable coating material comprising the steps of effecting a hydrolysis reaction of (a-1) 40 to 90 parts by weight (on a solid basis) of colloidal silica wherein the dispersion medium is a polar solvent, and (a-2) 60 to 10 parts by weight of a hydrolyzate and/or hydrolyzed and partially condensed product of an alkoxy silane compound containing not less than 50% by weight of a compound of the general formula (I)

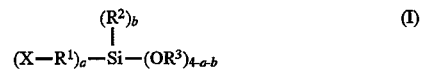

wherein X is $CH_2=CH-COO-$, $CH_2=C(CH_3)-COO-$ or $CH_2=CH-$, $R^1$ is a direct bond or an alkylene group having 1 to 8 carbon atoms, $R^2$ and $R^3$ are alkyl groups having 1 to 8 carbon atoms, a is a whole number of 1 to 3, b is a whole number of 0 to 2, and (a+b) has a value of 1 to 3;

replacing the dispersion medium of the colloidal silica with a nonpolar solvent when the amount of dehydration is in the range of 30 to 90% of theoretical value; and effecting a further condensation reaction while maintaining in the state of 30 to 90% by weight of solid components in the presence of the nonpolar solvent.

The above-described second object of the present invention is accomplished by the provision of an anti-abrasion coating composition consisting essentially of (A) 5 to 70 parts by weight (on a solid basis) of the UV-curable coating material prepared by the process of claim 1, (B) 30 to 95 parts by weight of a polyfunctional monomer having two or more (meth)acryloyloxy groups in the molecule, (C) 0.01 to 5 parts by weight of a photopolymerization initiator, per 100 parts by weight of the combined amount of components (A) and (B).

DESCRIPTION OF THE PREFERRED EMBODIMENTS

The present invention is more specifically described hereinbelow. First of all, the various components used for the process of the present invention are explained in greater detail.

The colloidal silica used as component (a-1) can be an ultrafine colloidal solution of silicic acid anhydride.

Colloidal silica can significantly improve the abrasion resistance of the cured film and is particularly effective in improving its abrasion resistance to fine particles such as sand. However, when a synthetic resin molded article is coated with colloidal silica alone, the resulting coating film has poor adhesion to the surface of the synthetic resin molded article.

The dispersion media which can used for colloidal silica is a polar solvent, and it includes water; alcohol solvents such as methanol, ethanol, isopropanol, n-propanol, isobutanol and n-butanol; polyhydric alcohol solvents such as ethylene glycol; polyhydric alcohol derivatives such as ethyl cellosolve and butyl cellosolve; ketone solvents such as methyl ethyl ketone, methyl isobutyl ketone and diacetone alcohol; and monomers such as 2-hydroxyethyl acrylate, 2-hydroxypropyl acrylate and tetrahydrofurfuryl acrylate. These dispersion media may be directly added, as colloidal solutions, to the coating compositions of the present invention. Among the above-described dispersion media, $C_{1-3}$ alcohol solvents are preferred for the reaction step with component (a-2).

Such colloidal silica can be produced according to well-known processes or is commercially available. Its average particle diameter is preferably in the range of 1 to 200 nm and more preferably in the range of 5 to 80 nm. If the average particle diameter is less than 1 nm, a gel tends to be produced in the reaction step. If the average particle diameter is greater than 200 nm, the resulting cured film tends to show a reduction in transparency.

The hydrolyzate and/or hydrolyzed and partially condensed product of the alkoxysilane compound of the general formula (I), used as component (a-2) serves to improve the compatibility between the colloidal silica used as component (a-1) and the polyfunctional monomer used as component (B). The use of the compound of the general formula (I) which has an acryloyl, methacryloyl or vinyl group and exhibits polymerization activity on exposure to ultraviolet light permits the formation of a chemical bond between such groups and the two or more (meth)acryloyloxy groups possessed by the monomer used as component (B) and thereby impart toughness to the cured film. Moreover, the combined use of colloidal silica as component (a-1) can further improve the abrasion resistance of the cured film and is particularly effective in improving its abrasion resistance to metal fibers such as steel wool.

Specific examples of the compound of the general formula (I) include 3-methacryloyloxypropyltrimethoxysilane, 3-acryloyloxypropyltrimethoxysilane, 2-methacryloyloxyethyltrimethoxysilane, 2-acryloyloxyethyltrimethoxysilane, 3-methacryloyloxypropyltriethoxysilane, 3-acryloyloxypropyltriethoxysilane, 2-methacryloyloxyethyltriethoxysilane, 2-acryloyloxyethyltriethoxysilane, 3-methacryloyloxypropylmethyldimethoxysilane, 3-acryloyloxypropylmethyldimethoxysilane, vinyltrimethoxysilane and vinyltriethoxysilane.

Preferred examples of the compound of the general formula (I) are 3-methacryloyloxypropyltrimethoxysilane, 3-acryloyloxypropyltrimethoxysilane, 3-methacryloyloxypropyltriethoxysilane, 3-acryloyloxypropyltriethoxysilane, vinyltrimethoxysilane and vinyltriethoxysilane.

Next, the process for preparing the UV-curable coating material of the present invention is explained in greater detail.

The first step of the process is to effect a hydrolysis reaction of the silane compound containing not less than 50% by weight of a compound of the general formula (I). The hydrolysis reaction of the silane compound in this step is, for example, conducted by the following ordinary process (1) or (2):

(1) 0.5 to 6 moles of a hydrolysis catalyst such as 0.001 to 0.1N hydrochloric acid solution or acetic acid solution is added to a mole of the silane compound with stirring at a room temperature or under heating to effect a hydrolysis reaction in the presence of an organic solvent (e.g. an alcohol solvent) or in the absence thereof, and thereafter the colloidal silica is added into the reactant.

(2) A hydrolysis catalyst is added into a mixture of the colloidal silica as component (a-1) and the silane compound as component (a-2) with stirring at a room temperature or under reflux.

The hydrolyzate and/or hydrolyzed and partially condensed product of the silane compound thus obtained is reacted with the colloidal silica fine particles. The reaction is conducted under an atmosphere pressure or a reduced pressure while distilling off volatile component (polar solvent) such as water and alcohol. When the amount of dehydration is in range of 30 to 90% of theoretical amount of distillate (theoretical value), the dispersion medium of the colloidal silica is replaced with a nonpolar solvent by azeotropic distilling with the nonpolar solvent under an atmosphere pressure or a reduced pressure. While the solvent being replaced, a further condensation reaction thereof is conducted at 60° to 150° C. (preferably 80° to 130° C.) with stirring for 0.5 to 10 hours while maintaining 30 to 90% (preferably 50 to 80%) by weight of the solid component until the amount of dehydration is in range of 90 to 100% of the theoretical value. In the condensation reaction, a catalyst such as an acid, a base and a salt may be optionally added into them to promote the reaction.

In the reaction, if the amount of dehydration is less than 50% of theoretical value, the dehydration condensation in the nonpolar solvent cannot sufficiently proceed. It is difficult to form a coating having a good weatherability and abrasion resistance by using a coating material obtained by such condensate products. On the other hand, in a nonpolar solvent, it is very difficult to effect a condensation of the colloidal silica as component (a-1) and the silane compound as component (a-2) into the state that the amount of dehydration becomes more than 90% of theoretical value.

The nonpolar solvent used in the present invention may be selected in accordance with the permittivity, dipole efficiency, or hydrogen bond parameter. The nonpolar solvent must be interpreted in a wide sense as to mean a solvent having a middle level of polarity. For example, a nonpolar solvent having a permittivity of 2 to 10 at 20° C. is preferably used in the present invention.

The nonpolar solvent is exemplified by hydrocarbons such as benzene, toluene, xylene, ethyl benzene, cyclohexane; halogenated hydrocarbons such as trichloroethylene, tetrachloroethylene; ethers such as 1,4-dioxane, dibutylether; ketones such as methylisobutylketone; esters such as n-butylacetate, isobutylacetate, ethylpropionate; polyhydric alcohols such as ethyleneglycol monobutyl ether. Furthermore, unsaturated ethylenic compounds such as a monomer having one or more (meth)acryloyloxy groups per a molecule can be used as the nonpolar solvent. Among these nonpolar solvents, aromatic hydrocarbons are preferably used, and toluene, xylene, 1,6-hexanediol diacrylate and 1,9-nonanediol diacrylate are especially preferably used.

By the reaction of the hydrolyzate and/or hydrolyzed, and partially condensed product of the silane compound with the colloidal silica particles in the nonpolar solvent, the curing property of the material is improved, and a transparent thick cured coating layer can be formed in the presence of a photostabilizer such as an ultraviolet light absorber. The UV-curable coating materials obtained by a process besides the process of the present invention are insufficient in the curing property. Therefore, in case that the cured coating film is thick, problems in the appearance such as decrease of the transparency and growth of cracks tend to occur. Furthermore, problems in the abrasion resistance, durability and weatherability of the cured coating film tend to occur.

The coating composition containing the UV-curable coating material of the present invention is superior not only in the curing property but also in the abrasion resistance, durability and weatherability of the cured film.

The concentration of solid components in the condensation reaction, which is the total amount of solid in the component (a-2) (calculated as a silanol) and the solid in the component (a-1), is in a range of 30 to 90% by weight. In case that the concentration of solid components is less than 30% by weight, that is the amount of the nonpolar solvent is more than 70% by weight, the reaction cannot sufficiently proceed, and the transparency of the thick cured coating film is inferior. In case that the concentration of solid components is more than 90% by weight, the reaction may proceed rapidly to produce a gel.

The temperature of the condensation reaction is preferably 60° to 150° C. If the temperature is less than 60° C., a long time is necessary for the reaction because the reaction is insufficient. If the temperature is more than 150° C., problems such as that the reactions besides the condensation of silicon occur or that a gel is produced.

In the condensation reaction, the ratio of solid in the component (a-1) to solid in the component (a-2) (calculated as a silanol) is given as (a-1)/(a-2)=40/60–90/10% by weight (based on the total amount of 100% by weight), preferably 50/50–80/20% by weight. In case that the ratio is outside the above range, for example, component (a-1) is more than 90% by weight, the reaction system become white muddy or gel is produced. In case that the component (a-1) is less than 40% by weight, the reaction is insufficient, and the transparency of the cured coating film tend to decrease when the film is thick. Furthermore, if the component (a-1) is more than 90% by weight, cracks tend to appear in the coating film. If the component (a-1) is less than 40% by weight, the abrasion resistance and transparency of the coating film decrease.

Next, the anti-abrasion coating composition of the present invention is explained in greater detail.

Re Component (A)

The UV-curable coating material as component (A) is prepared by the process stated above. Component (A) effects to improve the abrasion resistance, weather resistance and durability of the cured coating film. The amount (on a solid basis) of component (A) is 5 to 70 parts by weight, preferably 5 to 50 parts by weight per 100 parts by weight of the combined amount (on a solid basis) of the components (A) and (B). In case that the amount of component (A) is less than 5 parts by weight, it cannot sufficiently improve the abrasion resistance, weather resistance and durability. In case that the amount of component (A) is more than 70 parts by weight, cracks appear in the cured coating film.

Re Component (B)

The polyfunctional monomer having two or more (meth) acryloyloxy groups in the molecule used as component (B) serves to improve the toughness and adhesion to the substrate of the resulting cured film without reducing its abrasion resistance. If only component (A) is used to form a cured film, its abrasion resistance is excellent, but its adhesion to the substrate is insufficient. Moreover, such a cured film tends to produce cracks and other defects.

Specific examples of the component (B) include bis(2-acryloyloxyethyl) hydroxyethyl isocyanurate, 1,6-hexanediol diacrylate, 1,4-butanediol diacrylate, 1,9-nonanediol diacrylate, neopentyl glycol diacrylate, neopentyl glycol hydroxypivalate diacrylate and urethane diacrylate such as adduct of a mol of isphorone diisocyanate with 2 mol of 2-hydroxyethyl acrylate; and trifunctional or higher polyfunctional monomers such as trimethylolpropane triacrylate, pentaerythritol triacrylate, tris(acryloyloxyethyl) isocyanurate, ditrimethylolpropane tetraacrylate, pentaerythritol tetraacrylate, dipentaerythritol pentaacrylate and dipentaerythritol hexaacrylate, urethane triacrylate, polyester acrylic compounds prepared from polyhydric alcohol, polybasic acid, and (meth)acrylic acid, for example, trimethylol ethane/succinic acid/acrylic acid (2/1/4 mole). Furthermore, monomers disclosed in "UV. EB Curing Hand Book, Chapter of Raw Material" published by Kobunshi Kankokai.

Among these polyfunctional monomers, bis(2-acryloyloxy ethyl) hydroxyethyl isocyanurate, tris (acryloyloxyethyl) isocyanurate and urethane diacrylate such as adduct of a mol of isophorone diisocyanate with 2 mol of 2-hydroxyethyl acrylate are especially preferred because they are very effective on the toughness, weather resistance and durability of the cured coating film. Furthermore, a mixture of three monomers (the above preferred three polyfunctional monomers and 1,6-hexanediol diacrylate or 1,9-nonanediol diacrylate) are especially preferred in view of the toughness, adhesion to the substrate, weather resistance and durability.

Component (B) is used in an amount of 30 to 95 parts by weight, preferably 50 to 95 parts by weight, per 100 parts by weight of the combined amount of components (A) and (B). If the amount of component (B) is less than 30 parts by weight, the resulting cured film does not have sufficient toughness, adhesion to the substrate, thermal resistance and weather resistance. If the amount of component (B) is greater than 95 parts by weight, the resulting cured film shows a reduction in abrasion resistance.

Re Component (C)

A photopolymerization initiator as component (C) is added into the coating composition of the present invention. Component (C) is exemplified by carbonyl compounds such as benzoin, benzoin methylether, benzoin ethylether, benzoin isopropylether, benzoin isobutylether, acetoin, butyroin, benzyl, benzophenone, p-methoxy benzophenone, diethoxy acetophenone, α,α-dimethoxy-α-phenyl acetophenone, methyl phenylglyoxylate, ethyl phenylglyoxylate, 4,4-bis(dimethylamino benzophenone), 2-hydroxy-2-methyl-1-phenylpropane-1-on, 1-hydroxycyclohexyl phenylketone, 2,2-dimethoxy-1,2-diphenylethane-1-on, 1-(4-isopropylphenyl)-2-hydroxy-2-methylpropane-1-on; sulfur compounds such as tetramethylthiuram disulfide, 2-methyl-1-[4-(methylthio)phenyl]-2-morpholynopropanone-1; azo compounds such as azobisisobutyronitrile, azo bis-2,4-dimethylvaleronitrile; peroxide compounds such as benzoin peroxide, di-t-butyl peroxide; phosphineoxide compounds such as 2,4,6-trimethylbenzoyldiphenyl phosphine oxide, bis(2,6-dimethoxybenzoyl)-2,4,4-trimethylphenyl phosphine oxide.

It is especially preferred to use 2,4,6-trimethylbenzoyldiphenyl phosphineoxide with the other initiator as component (c) in view of the weather resistance and durability of the cured coating film.

Component (C) is used in an amount of 0.01 to 5 parts by weight, preferably 0.1 to 3 parts by weight, per 100 parts by weight of the combined amount of components (A) and (B). If the amount of component (C) is less than 0.01 part by weight, the resulting coating composition does not have sufficient curability. If the amount of component (C) is greater than 5 parts by weight, the resulting cured film suffers a coloration and shows a reduction in weather resistance.

In a preferred embodiment, the coating compositions of the present invention additionally contain an ultraviolet absorber (D) and a hindered amine type light stabilizer (E).

No particular limitation is placed on the type of the ultraviolet absorber used as component (D), and there may be used any ultraviolet absorber that can be homogeneously dissolved in the coating composition and imparts good weather resistance thereto. However, ultraviolet absorbers derived from benzophenone, benzotriazole, phenyl salicylate and phenyl benzoate and having a maximum absorption band in the wavelength range of 240 to 380 nm are preferred because they have good solubility in the coating composition and are effective in improving its weather resistance. Among others, ultraviolet absorbers derived from benzophenone are especially preferred in that the coating composition can contain them in large amounts, and ultraviolet absorbers derived from benzotriazole are especially preferred in that they can prevent substrate materials such as polycarbonate from yellowing. Thus, it is most preferable to use these two types of ultraviolet absorbers in combination.

Specific examples of component (D) include 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy-4-methoxybenzophenone, 2,2'-dihydroxy-4,4'dimethoxybenzophenone, 2-[4-((2-hydroxy-3-tridecyloxypropyl)-oxy]2-hydroxyphenyl]-4,6-bis(2,4-dimethylphenyl)-1,3,5-triazine, phenyl salicylate, p-tert-butylphenyl salicylate, p-(1,1,3,3-tetramethylbutyl)phenyl salicylate, 3-hydroxyphenyl benzoate, phenylene-1,3-dibenzoate, 2-(2-hydroxy-5-methylphenyl)benzotriazole, 2-(2-hydroxy-5-tert-butylphenyl)-2H-benzotriazole, 2-(2-hydroxy-3,5-di-tert-butylphenyl)-5-chlorobenzotriazole, 2-(2-hydroxy-3,5-di-tert-butylphenyl)benzotriazole and 2-(2-hydroxy-5-tert-octylphenyl)-2H-benzotriazole. Among others, 2-hydroxy-4-octoxybenzophenone and 2,4-dihydroxybenzophenone, which are derived from benzophenone, and 2-(2-hydroxy-5-tert-butylphenyl)-2H-benzotriazole, which is derived from benzotriazole, are especially preferred. These ultraviolet absorbers may be used in admixture of two or more.

Component (D) is used in an amount of 0.1 to 20 parts by weight, preferably 1 to 10 parts by weight, per 100 parts by weight of the combined amount of components (A) and (B). If the amount of component (D) is less than 0.1 part by weight, the resulting cured film may not have sufficient weather resistance and may fail to effectively protect the substrate from ultraviolet radiation. If the amount of component (D) is greater than 20 parts by weight, the coating film may not be cured completely and the resulting cured film may show a reduction in toughness, thermal resistance and abrasion resistance.

The hindered amine type light stabilizer used as component (E), in cooperation with the ultraviolet absorber used as component (D), serves to further improve the weather resistance of the cured film. Specific examples of component (E) include bis(1,2,2,6,6-pentamethyl-4-piperidyl) sebacate, bis (2,2,6,6-tetramethyl-4-piperidyl) sebacate and bis(1,2,2,6,6-pentamethyl-4-piperidyl) 2-(3,5-di-t-butyl-4-hydroxybenzyl)-2-n-butylmalonate. Among others, bis(1,2, 2,6,6-pentamethyl-4-piperidyl) sebacate and bis(2,2,6,6-tetramethyl-4-piperidyl) sebacate are especially preferred.

Component (E) is used in an amount of 0.1 to 5 parts by weight, preferably 0.5 to 2 parts by weight, per 100 parts by weight of the combined amount of components (A) and (B). If the amount of component (E) is less than 0.1 part by weight, the resulting cured film may not have sufficient weather resistance and durability. If the amount of component (E) is greater than 5 parts by weight, the coating film may not be cured completely and the resulting cured film may show a reduction in toughness, thermal resistance and abrasion resistance.

If necessary, the coating compositions of the present invention can contain, in addition to the above-described components (A), (B), (C), (D) and (E), various additives such as organic solvents, antioxidants, anti-yellowing agents, bluing agents, pigments, leveling agents, anti-foaming agents, thickening agents, anti-settling agents, anti-static agents and anti-fogging agents according to the need.

The organic solvent may be added into the coating composition of the present invention for giving a property such as uniform solubility, stable dispersion, adhesion to the substrate, and smoothness and uniformity of the coating film. No particular limitation is placed on the type of the organic solvent if the solvent can give the property. The organic solvent is exemplified by alcohol type solvents, hydrocarbon type solvents, halogenated hydrocarbon type solvents, ether type solvents, ketone type solvents, ester type solvents, polyhydric alcohol derivatives. The organic solvent may be used in an amount of 20 to 800 parts by weight per 100 parts by weight of the coating composition.

In order to apply the coating compositions of the present invention to substrates, there may be employed a variety of techniques such as brushing, spray coating, dip coating, spin coating and curtain coating.

The thickness of the cured coating film prepared by the composition of the present invention is ordinary 3 to 30 μm, preferably 5 to 25 μm, more preferably 8 to 20 μm. In case that the thickness is less than 3 μm, the abrasion resistance of the cured coating film tends to become insufficient. In case that the thickness is more than 30 μm, the adhesion to the substrate tends to decrease, and cracks appear in the film.

The composition coated on a substrate can be cured by exposing it to an active energy ray such as α-ray, β-ray, Γ-ray in accordance with a method publicly known. However, ultraviolet light is preferably used for the curing. Ultraviolet lamps are ordinary used as the source of ultraviolet light because of the utility and the costs. The ultraviolet lamps are, for example, low-pressure mercury vapor lamps, high-pressure mercury vapor lamps, ultra high-pressure mercury vapor lamps, xenon lamps, metal halide lamps. The atmosphere for exposure to ultraviolet light may be air, and it is unnecessary to use an inert gas (such as nitrogen gas or argon) on purpose.

After the coating compositions of the present invention are applied to the surfaces of synthetic resin molded articles and before they are cured by means of the radiant energy of ultraviolet light, they may be heat-treated at 20° to 120° C. for 1 to 60 minutes by exposure to infrared radiation or in a hot-air drying oven in order to improve the adhesion of the cured film to the substrate.

The coating compositions of the present invention can be used to improve the surface quality of various synthetic resin molded articles constituting substrates. Such synthetic resin molded articles include those formed of various thermoplastic and thermosetting resins of which an improvement in abrasion resistance, weather resistance and other properties has heretofore been demanded. Specific examples of such materials include polymethyl methacrylate resin, polycarbonate resins, polyester resins, polystyrene resin, ABS resins, acrylonitrile-styrene copolymer resin, polyamide resins, polyarylate resins, polymethacrylimide resin and poly(allyl diglycol carbonate) resin. Among others, polymethyl methacrylate resin, polycarbonate resins, polystyrene resin and polymethacrylimide resin can be effectively used as substrate materials for the coating compositions of the present invention because they have high transparency and are faced with a strong demand for an improvement in abrasion resistance. The term "synthetic resin molded articles" denotes a variety of molded articles formed of these resins, including sheet-like molded articles, film-like molded articles, various injection-molded articles and the like.

The present invention is more specifically explained with reference to the following examples.

EXAMPLES 1 TO 11

A 3-liter four-necked flask fitted with a stirrer, a thermometer and a condenser was charged with colloidal silica (commercially available from Nissan Chemical Industries, Ltd. under trade name IPA-ST; dispersion medium= isopropanol, $SiO_2$ density=30% by weight, primary particle size=12 nm; abbreviated as "IPA-ST" hereinafter), and 3-methacryloyloxypropyl trimethoxysilane (commercially available from Nippon Unicar Co., Ltd. under the trade name of A-174; abbreviated as "A-174" hereinafter) in the amounts shown in Table 1.

This mixture was heated with stirring. On starting the reflux of volatile components, 14 parts by weight of 0.001N hydrochloric acid solution was dropwised into the mixture. After the dropwise was completed, the hydrolysis reaction was conducted for 2 hours with stirring and under the reflux. After the hydrolysis reaction was completed, the volatile components such as alcohol and water were distilled off from the liquid thus obtained under an atmospheric pressure. At the time that the amount of dehydration becomes 70% of theoretical value, 60 parts by weight of toluene was added and then the resultant was azeotropic distilled to obtain a dispersion system of toluene. Furthermore, 120 parts by weight of toluene was added by dividing into several times, the replacement of solvent were completed to obtain a dispersion system of toluene. The concentration of solid (the combined amount of $SiO_2$ and A-174 silanol) was about 60% by weight. Then, the reaction system was heated, and the toluene and water were distilled off. At the time that the amount of dehydration become 95% of theoretical value, the reaction was conducted at 110° C. for 4 hours. In this reaction step, the toluene was added by dividing into several times to maintain the solid content of 60% by weight in the reactant. After the reaction was finished, the volatile components such as toluene were distilled off under reduced pressure to increase the solid content until that the final solid content of was 70% by weight.

COMPARATIVE EXAMPLES 1 TO 6

In the reactions of precondensing procedure, no replacement of dispersion medium of the colloidal silica with a nonpolar solvent was not conducted in Comparative Examples 1 to 4. Furthermore, no hydrolysis reaction was conducted in Comparative Examples 5 and 6. The other process was conducted as in the Examples.

Compositions of Examples 1 to 11 and Comparative Examples 1 to 6 as shown in Table 2 were prepared using the reactant thus obtained, bis(acryloyloxyethyl) hydroxyethyl isocyanurate, tris(acryloyloxyethyl) isocyanurate, urethane diacrylate, 1,9-nonanediol diacrylate, UV initiator (2,4,6-trimethylbenzoyl diphenylphosphineoxide), UV absorber [2-(hydroxy-5-t-butylphenyl)-2H-benzotriazol] and hindered amine type light stabilizer [bis(2,2,6,6-tetramethyl-4-piperidyl)sebacate] in the amounts shown in Table 1.

TABLE 1

| | Coating Composition | | | (parts by weight) | | | Preconden- |
|---|---|---|---|---|---|---|---|
| | a-1/a-2 → (A) | | (B) | | | | sing- |
| No | CS/MTS (ratio) | Reactant | BAEIC/TAEIC (ratio) | (C) APO | (D) UVA | (E) HALS | procedure |
| Ex 1 | (60/40) | 50 | 50  0 (100/0) | 1.3 | 6.0 | 0.3 | 1: YES 2: YES |
| Ex 2 | (60/40) | 50 | 40  10 (80/20) | 1.3 | 6.0 | 0.3 | 1: YES 2: YES |
| Ex 3 | (60/40) | 50 | 30  20 (60/40) | 1.3 | 6.0 | 0.3 | 1: YES 2: YES |
| Ex 4 | (60/40) | 50 | 20  30 (40/60) | 1.3 | 6.0 | 0.3 | 1: YES 2: YES |

TABLE 1-continued

| | Coating Composition | | | (parts by weight) | | | Preconden- sing- procedure |
|---|---|---|---|---|---|---|---|
| | a-1/a-2 → (A) | | (B) | | | | |
| No | CS/MTS (ratio) | Reactant | BAEIC/TAEIC (ratio) | (C) APO | (D) UVA | (E) HALS | |
| Ex 5 | (60/40) | 30 | 70  0 (100/0) | 1.3 | 6.0 | 0.3 | 1: YES 2: YES |
| Ex 6 | (60/40) | 30 | 56  14 (80/20) | 1.3 | 6.0 | 0.3 | 1: YES 2: YES |
| Ex 7 | (60/40) | 30 | 42  28 (60/40) | 1.3 | 6.0 | 0.3 | 1: YES 2: YES |
| Ex 8 | (60/40) | 30 | BAEIC (40)28 TAEIC (40)28 C9DA (20)14 | 1.3 | 6.0 | 0.3 | 1: YES 2: YES |
| Ex 9 | (60/40) | 30 | BAEIC (60)42 UDA (40)28 | 1.3 | 6.0 | 0.3 | 1: YES 2: YES |
| Ex 10 | (60/40) | 50 | TAEIC (20)10 UDA (40)28 | 1.3 | 6.0 | 0.3 | 1: YES 2: YES |
| Ex 11 | (60/40) | 30 | BAEIC (40)28 TAEIC (40)28 C9DA (20)14 | 1.3 | 0 | 0.1 | 1: YES 2: YES |

TABLE 2

| | Coating Composition | | | (parts by weight) | | | Preconden- sing- procedure |
|---|---|---|---|---|---|---|---|
| | a-1/a-2 → (A) | | (B) | | | | |
| No | CS/MTS (ratio) | Reactant | BAEIC/TAEIC (ratio) | (C) APO | (D) UVA | (E) HALS | |
| Cx 1 | (60/40) | 50 | 50  0 (100/0) | 1.3 | 6.0 | 0.3 | 1: YES 2: NO |
| Cx 2 | (60/40) | 50 | 30  20 (60/40) | 1.3 | 6.0 | 0.3 | 1: YES 2: No |
| Cx 3 | (60/40) | 30 | 70  0 (100/0) | 1.3 | 6.0 | 0.3 | 1: YES 2: NO |
| Cx 4 | (60/40) | 30 | 42  28 (60/40) | 1.3 | 6.0 | 0.3 | 1: YES 2: NO |
| Cx 5 | CS 30 MTS 20 | | 50  0 (100/0) | 1.3 | 6.0 | 0.3 | 1: NO 2: NO |
| Cx 6 | CS 18 MTS 12 | | 70  0 (100/0) | 1.3 | 6.0 | 0.3 | 1: NO 2: NO |

CS: Colloidal silica (solid base)
MTS: 3-Methacryloyloxypropyl trimethoxysilane
Reactant: Reactant (solid base) obtained by hydrolysis reaction of MTS with CS
BAEIC: Bis(acryloyloxyethyl) hydroxyethyl isocyanurate
TAEIC: Tris(acryloyloxyethyl) isocyanurate
UDA: Urethane diacrylate synthesized one mol of isophorone diisocyanate and 2 mol of 2-hydroxy ethyl acrylate
C9DA: 1,9-Nonanediol diacrylate
APO: Acylphosphine oxide [2,4,6-trimethylbenzoyl-diphenylphosphineoxide]
UVA: UV absorber [2-(hydroxy-5-t-butylphenyl)-2H-benzotriazol]
HALS: Hindered amine type light stabilizer [bis(2,2,6,6-tetramethyl-4-piperidyl)sebacate]
Precondensing procedure:
1: YES — The hydrolysis reaction was conducted.
No — The hydrolysis reaction was not conducted.
2: YES — The replacement of dispersion medium of the colloidal silica with a nonpolar solvent was conducted.
No — The replacement of dispersion medium of the colloidal silica with a nonpolar solvent was not conducted.

Then, (1) a 100 mm×100 mm×3 mm (thick) injection-molded plate made of a polycarbonate (commercially available from General Electric Company under the trade name of Lexan LS-2, color 111 clear) in Examples 1 to 10 and Comparative Examples 1 to 6, or (2) a 100 mm×100 mm×3 mm (thick) injection-molded plate made of a polymethylmethacrylate (commercially available from Mitsubishi Rayon Company under the trade name of Acrypet VH, color 001 clear) in Example 11, was spray-coated with the above coating compositions further containing 100 parts by weight of isobutanol, 60 parts by weight of n-butyl acetate and 40 parts by weight of 2-methoxy-1-propanol, and allowed to stand at room temperature for 10 minutes, and was then heated in a dryer at 65° C. for 5 minutes.

Thereafter, the coated plate was exposed in an atmosphere of air to ultraviolet light from a high-pressure mercury vapor lamp so as to provide an energy of (1) 2,000 mJ/cm² in Examples 1 to 10 and Comparative Examples 1 to 6, or (2) 1,000 mJ/cm² in Example 11, (as expressed by the integrated energy of ultraviolet light over the wavelength range of 320 to 380 nm). Thus, a cured film having a thickness of 13 μm was formed on the polycarbonate plate. The films were evaluated according to the following procedures.

(1) Appearance

The appearance of the uncured coatings obtained was visually evaluated.

(2) Haze

The Haze was measured in accordance with ASTM D-1003.

(3) Steel Wool Abrasion Resistance

A piece of #000 steel wool (commercially available from Nippon Steel Wool Co., Ltd. under the trade name of Bonstar) was attached to a circular pad having a diameter of 25 mm, placed on the surface of a sample held on the table of a reciprocating abrasion testing machine, and moved back and forth 50 cycles under a load of 3,000 g. Thereafter, the sample was washed with a neutral detergent and its haze was measured with a hazemeter. The abrasion resistance is expressed by [(haze after abrasion)–(haze before abrasion)]

(4) Taber Abrasion Resistance (ASTM D-1044)

This evaluation was done in accordance with ASTM D-1044.

Apparatus: Taber Abrader (CS-10F wheel, 500 g load for each wheel).

Procedure: 1. Mar the surface of coated sample 500 cycles. 2. After the test, measure the Haze in accordance with ASTM D-1003.

Thereafter, the sample was washed with a neutral detergent and its haze was measured with a hazemeter. The abrasion resistance is expressed by [(haze after abrasion)–(haze before abrasion)]

(5) Adhesion

By cutting the cured film of a sample with a razor at intervals of 1.5 mm, 11 parallel cuts were made in each of two orthogonal directions so as to reach the substrate. Thus, a total of 100 squares were formed in the cured film. A strip of cellophane adhesive tape (25 mm wide; manufactured by Nichiban Co., Ltd.) was applied thereto under pressure and peeled off upward and quickly, and the number of the squares removed from the substrate was counted. The adhesion is expressed by (number of remaining squares)/(total number of squares=100).

(6) Weatherability

The weatherability (SWOM, 1000 hrs/2000 hrs) was evaluated as follows:

Apparatus: Carbon Arc Weather-o-meter WEL-SUN-HC-B (SUGA TEST INSTRUMENT CO., LTD.)

Condition: Below two cycles are repeated.

| Test | Time | Black panel temp. | Humidity |
|---|---|---|---|
| UV radiation | 48 min. | 63° C. | 80–90 (% RH) |
| UV radiation and water spray | 12 min. | 30–40° C. | 90–95 (% RH) |

Procedure: 1. Fixing the coated sample on the holder. Taking it out after 1000 hours and 2000 hours, respectively. 2. After testing, observing coated surface by visual inspection and performing some microscopic examinations and the adhesion test.

Results

| | |
|---|---|
| (Excellent) | The specimen showed no surface deterioration, crazing, cracking, hazing, delamination, or loss of surface luster. |
| (Good) | The specimen showed no surface deterioration, crazing, cracking, hazing, delamination, but small loss of surface luster. |
| (Poor) | The specimen showed some surface deterioration, crazing, cracking, hazing, delamination, or loss of surface luster. |

TABLE 3

| No | Appearance | Haze (%) | Steel wool Abrasion Resistance (Δ Haze: %) | Tabar Abrasion Resistance (Δ Haze: %) | Adhesion | Weatherability (SWOM) 1000 hrs/ 2000 hrs |
|---|---|---|---|---|---|---|
| Ex 1 | Excellent | 0.3 | 0.1 | 12.8 | 100/100 | Excellent/Excellent |
| Ex 2 | Excellent | 0.4 | 0.2 | 13.0 | 100/100 | Excellent/Excellent |
| Ex 3 | Excellent | 0.5 | 0.4 | 13.5 | 100/100 | Excellent/Excellent |
| Ex 4 | Excellent | 0.5 | 0.4 | 13.7 | 100/100 | Excellent/Excellent |
| Ex 5 | Excellent | 0.3 | 0.3 | 13.3 | 100/100 | Excellent/Excellent |
| Ex 6 | Excellent | 0.4 | 0.3 | 13.5 | 100/100 | Excellent/Excellent |
| Ex 7 | Excellent | 0.5 | 0.5 | 13.9 | 100/100 | Excellent/Excellent |
| Ex 8 | Excellent | 0.4 | 0.5 | 13.6 | 100/100 | Excellent/Excellent |
| Ex 9 | Excellent | 0.3 | 0.5 | 14.5 | 100/100 | Excellent/Excellent |
| Ex 10 | Excellent | 0.4 | 0.4 | 14.8 | 100/100 | Excellent/Excellent |
| Ex 11 | Excellent | 0.3 | 0.5 | 13.4 | 100/100 | Excellent/Excellent |
| Cx 1 | Excellent | 0.8 | 0.5 | 19.5 | 100/100 | Excellent/Excellent |
| Cx 2 | Excellent | 1.0 | 0.7 | 22.3 | 100/100 | Excellent/Good |
| Cx 3 | Excellent | 0.3 | 0.9 | 24.4 | 100/100 | Excellent/Good |
| Cx 4 | Excellent | 0.7 | 1.0 | 25.1 | 100/100 | Good/Good |
| Cx 5 | Excellent | 22.6 | 25.3 | 36.8 | 50/100 | Poor/Very poor |
| Cx 6 | Excellent | 18.7 | 20.7 | 32.4 | 80/100 | Poor/Very poor |

As shown in Tables 3 and 4, the Examples 1 to 11 are superior in the appearance, Haze, abrasion resistance, adhesion and weatherability to the Comparative Examples 1 to 6.

What is claimed as new and desired to be secured by Letters Patent of the United States is:

1. A process for preparing a UV-curable coating material comprising the steps of effecting a hydrolysis reaction of (a-1) 40 to 90 parts by weight (on a solid basis) of colloidal silica wherein the dispersion medium is a polar solvent, and (a-2) 60 to 10 parts by weight of a hydrolyzate and/or hydrolyzed and partially condensed product of an alkoxy silane compound containing not less than 50% by weight of a compound of the general formula (I)

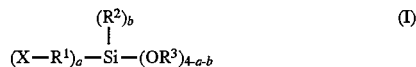

wherein X is $CH_2=CH-COO-$, $CH_2=C(CH_3)-COO-$ or $CH_2=CH-$, $R^1$ is a direct bond or an alkylene group having 1 to 8 carbon atoms, $R^2$ and $R^3$ are alkyl groups having 1 to 8 carbon atoms, a is a whole number of 1 to 3, b is a whole number of 0 to 2, and (a+b) has a value of 1 to 3;

replacing the dispersion medium of the colloidal silica with a nonpolar solvent when the amount of dehydration is in the range of 30 to 90% of theoretical value; and effecting a further condensation reaction while maintaining in the state of 30 to 90% by weight of solid components in the presence of the nonpolar solvent.

2. An anti-abrasion coating composition consisting essentially of (A) 5 to 70 parts by weight (on a solid basis) of the UV-curable coating material prepared by the process of claim 1, (B) 30 to 95 parts by weight of a polyfunctional monomer having two or more (meth)acryloyloxy groups in the molecule, (C) 0.01 to 5 parts by weight of a photopolymerization initiator, per 100 parts by weight of the combined amount of components (A) and (B).

3. An anti-abrasion coating composition of claim 2 which further contains (D) 0.1 to 20 parts by weight of an ultraviolet light absorber, and (E) 0.1 to 5 parts by weight of a hindered amine type light stabilizer, per 100 parts by weight of the combined amount of components (A) and (B).

* * * * *